United States Patent [19]

Zapel

[11] 4,171,787
[45] Oct. 23, 1979

[54] VARIABLE CAMBER LEADING EDGE FOR AIRFOIL

[76] Inventor: Edwin J. Zapel, Box 433, Maple Valley, Wash. 98038

[21] Appl. No.: 817,542

[22] Filed: Jul. 21, 1977

[51] Int. Cl.² ............................................. B64C 3/48
[52] U.S. Cl. ................................... 244/219; 244/214
[58] Field of Search ................ 244/219, 218, 214, 215

[56] References Cited

U.S. PATENT DOCUMENTS

| 1,763,888 | 6/1930 | Griswold | 244/219 X |
| 1,828,981 | 10/1931 | Parker | 244/219 |
| 2,022,806 | 12/1935 | Grant | 244/219 |
| 2,650,047 | 8/1953 | Carhart et al. | 244/214 |
| 2,749,060 | 6/1956 | Brady et al. | 244/214 |
| 2,763,448 | 9/1956 | Davie | 244/219 X |
| 3,836,099 | 9/1974 | O'Neill et al. | 244/214 |
| 3,941,334 | 3/1976 | Cole | 244/214 |
| 4,040,579 | 8/1977 | McKinney | 244/214 |

FOREIGN PATENT DOCUMENTS 103400  1/1917  United Kingdom ..................... 244/219

*Primary Examiner*—Barry L. Kelmachter

[57] ABSTRACT

An airfoil having a support frame, a rigid nose section, and upper and lower variable camber skin sections extending from the nose section rearwardly to the support frame. The frame has a rigid mounting arm which extends forwardly into the variable camber section, and a pivot link is connected from that mounting arm to a lower portion of the nose section so that is is able to swing downwardly and rearwardly to its cambered position. A toggle linkage connects an upper portion of the nose section to the frame just beneath the upper variable camber skin section. Flexure of the toggle linkage during downward movement of the nose section reduces the chord length of the arc of the variable camber upper skin section so that a proper continuous curve is formed by the upper variable camber skin section from the nose section back to the frame. Other linkage coordinates the movement of the toggle link, the pivot link, and other actuating linkage which moves the rear end of the variable camber lower skin section rearwardly.

17 Claims, 6 Drawing Figures

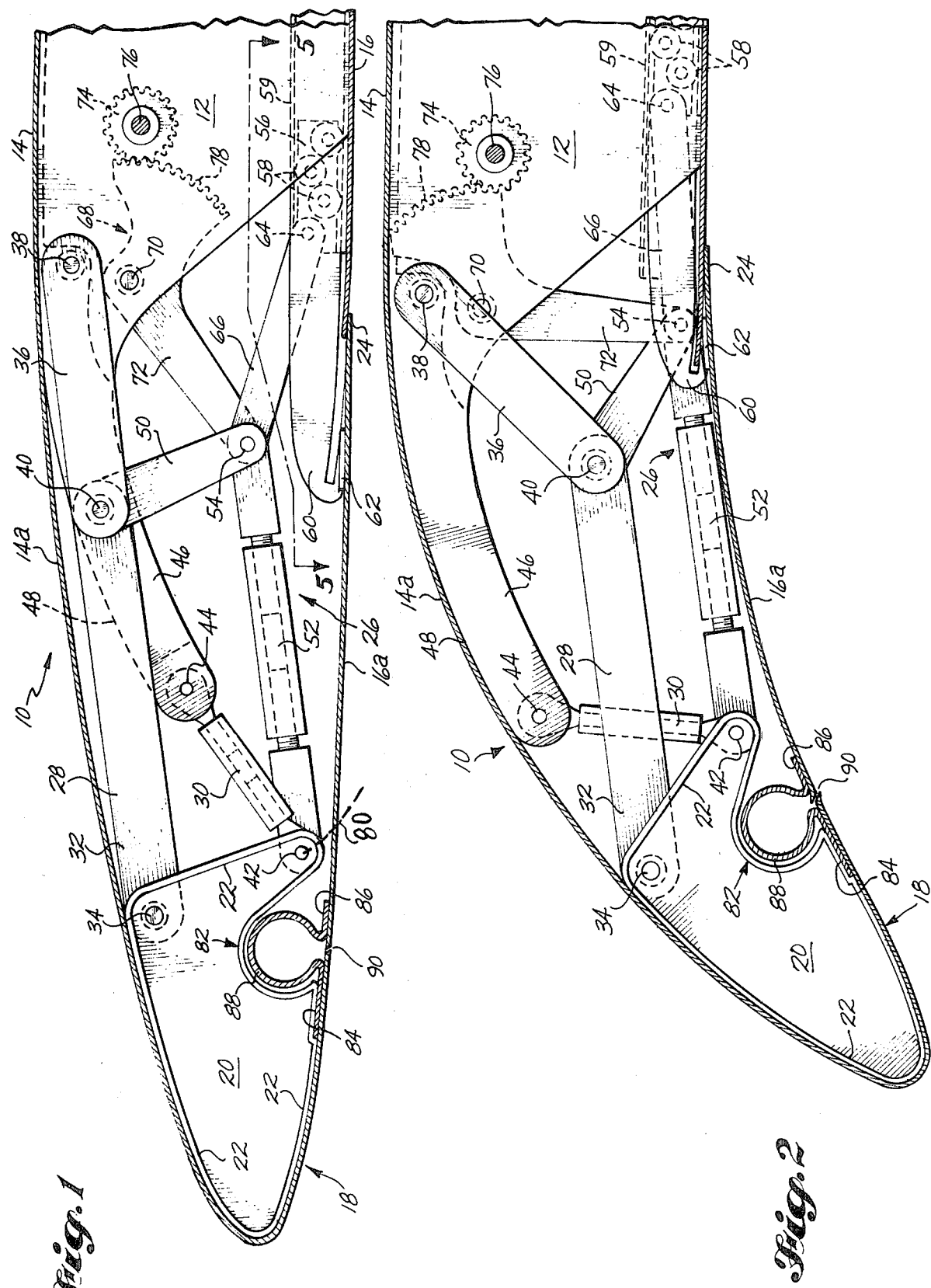

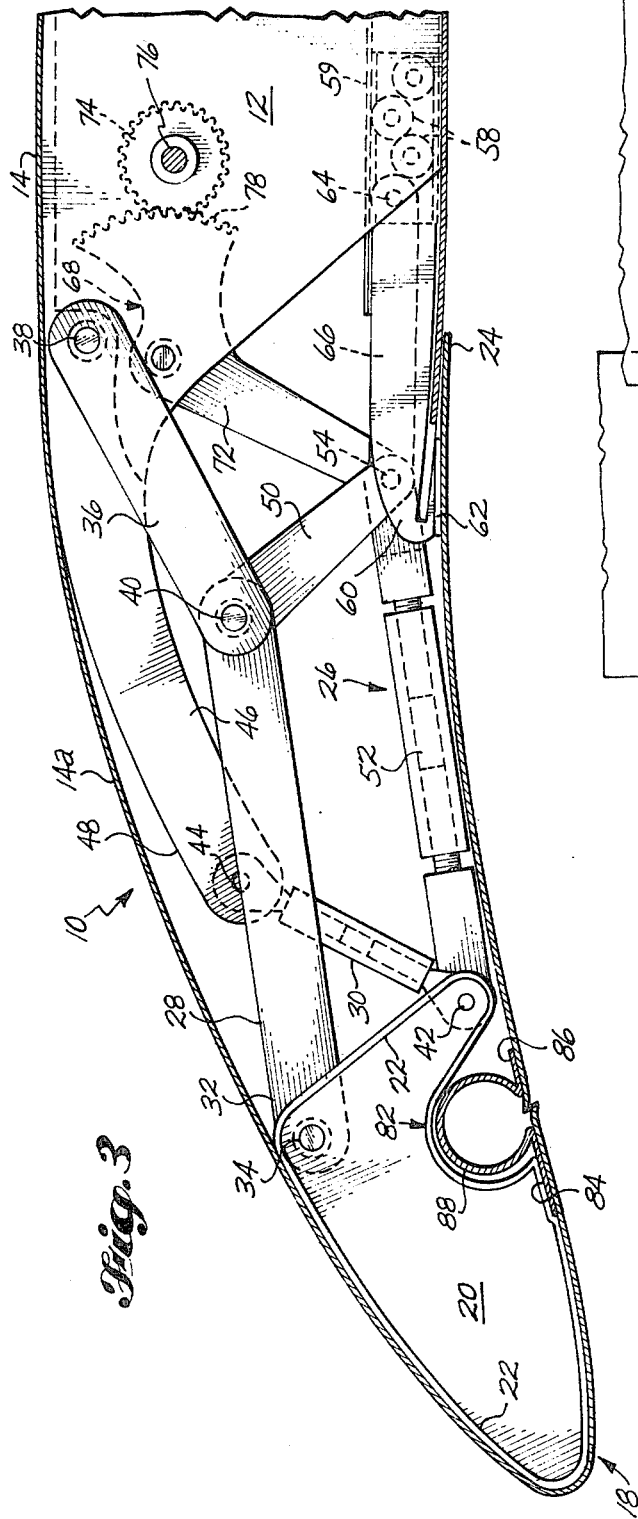
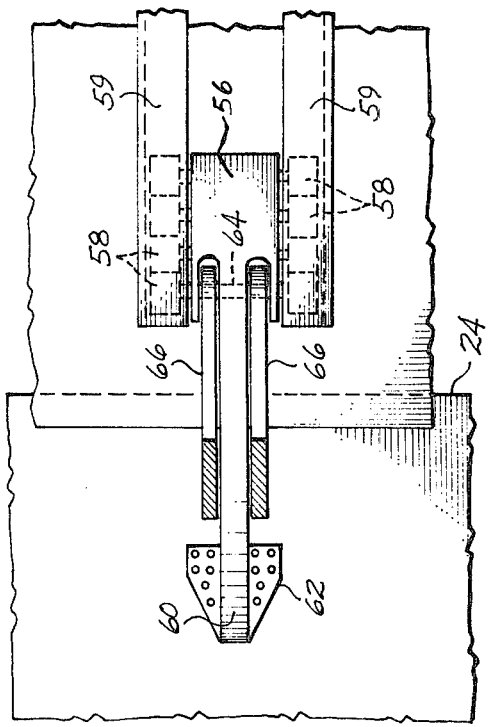
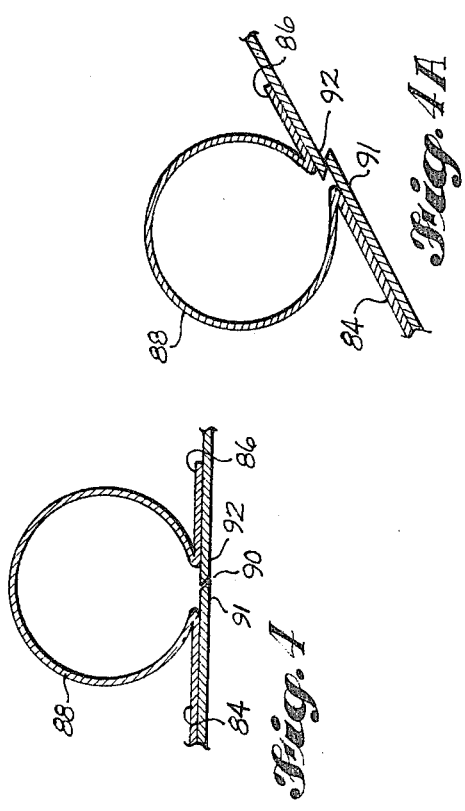

VARIABLE CAMBER LEADING EDGE FOR AIRFOIL

BACKGROUND OF THE INVENTION

A. Field of the Invention

The present invention relates to a variable camber airfoil, and more particularly to an apparatus particularly adapted to vary the camber of the leading edge portion of an airfoil.

B. Brief Description of the Prior Art

A common way of modifying the lift characteristics of an airfoil for low speed operation is to use leading edge devices which either pivot or slide outwardly from the leading edge of the airfoil to a deployed position. With many such devices, there is the problem that during deployment there is an interruption of smooth airflow over the airfoil. Also many of these devices are not able to be deployed to intermediate positions while maintaining the proper flow of air over the airfoil.

Accordingly, there have appeared in the prior art various devices to vary the shape of the airfoil itself in a manner to change the camber and thus modify its lift characteristics. One such device is shown in U.S. Pat. No. 1,763,888, Griswold II, in which the nose section of an airfoil is pivotally mounted at its upper rear end to the aircraft structure. A bell crank is attached to the lower portion of the nose to deflect it downwardly for increased camber. A somewhat similar device is shown in U.S. Pat. No. 2,650,047, Carhart et al, where the nose section of the airfoil is pivotally mounted to an intermediate link which is in turn mounted to the airfoil frame so that the nose can be deflected downwardly to increase the camber of the airfoil.

Another device to deflect the nose end of an airfoil downwardly is shown in Brady et al, U.S. Pat. No. 2,749,060, where the nose section is mounted to the main frame of the airfoil by means of two pivotally mounted links. The two links are so positioned that as the lower link is pulled rearwardly, the nose of the airfoil follows a path which resembles downward pivotal movement about a point at the forward end of the airframe.

U.S. Pat. No. 1,828,981, Parker, shows a mechanism to modify the camber along the entire chord length of the airfoil. This is accomplished by connecting the lower skin of the airfoil to a plurality of pivotally mounted links, the angular positions of which are offset with respect to one another. Rotation of these links causes the middle portion of the lower skin to deflect upwardly, while the trailing edge portion of the airfoil is deflected downwardly. U.S. Pat. No. 2,022,806, Grant, shows another mechanism for changing the camber along substantially the entire chord length of the wing by providing the wing with a supporting framework made up of a plurality of triangular trusses, the lower ends of which can be moved relative to each other. By moving the lower ends of the trusses either closer or further away from one another, the length of the lower skin of the wing can be changed with respect to the length of the upper skin, so as to cause a corresponding change in the camber of the wing.

In U.S. Pat. No. 2,763,448, Davie Jr., a roller is positioned inside the leading edge of the airfoil, and the location of this roller is modified by a cable mechanism to change the configuration of the leading edge of the airfoil.

In U.S. Pat. No. 3,836,099, O'Neill et al, there is shown a mechanism to vary the camber of the leading edge of an airfoil in a manner that the upper forward skin section of the airfoil is bent in a more or less continuous curve from the nose section back to the main airfoil section. In this mechanism, the upper and lower forward skin sections are interconnected by a plurality of diagonal links, the lower ends of which are interconnected by a plurality of bell cranks operated from a common actuating arm. By moving the actuator arm rearwardly, the several bell cranks cause the forward lower skin section to contract, and thus deflect the nose downwardly and rearwardly.

U.S. Pat. No. 3,941,334, Cole, shows several different mechanisms for deflecting both the leading and trailing edges of an airfoil. In general, these devices comprise a rib beam or the like which extends into the cambered section, with this rib beam being deflected upwardly or downwardly to change the camber. The rib beam has associated linkage to deflect the extreme outer portion of the cambered section to an angle greater than the deflection of the rib beam itself.

While the prior art has provided devices which are operable to change the camber of an airfoil, there is still a continuing need to seek improvements with regard to simplicity and reliability of structure and operation, and also to accomplish the change of camber so that the airfoil, particularly with regard to the upper surface, is always in a smooth continuous curve with no significant surface discontinuities to induce flow separation.

SUMMARY OF THE INVENTION

The variable camber airfoil of the present invention comprises a support frame, upper and lower skins attached to the frame, and a forward nose section. There is a variable camber upper skin section extending from the nose section rearwardly to connect to the forward end of the support frame. Additionally, there is a variable camber lower skin section connected at a forward location to the nose section and extending rearwardly therefrom toward the frame.

A pivot link is connected by its forward end to a lower portion of the nose section at a first forward connecting location, and is connected by a rear end thereof to the frame at a first rear pivot connection located upwardly and rearwardly of the first forward connecting location. Additionally, there is a toggle linkage having a forward swing end portion connected to an upper portion of the nose section at a second forward connecting location which is above the first connecting location of the pivot link. The toggle linkage has a rear pivot end portion having a second rear pivot connection to the frame at a location rearwardly of the second forward connecting location. Additionally, the toggle linkage has an intermediate flexure point about which the first and second portions of the toggle linkage flex relative to each other.

Actuating means of the present invention causes the pivot link to swing downwardly and rearwardly and simultaneously causes the toggle linkage to flex about its flexure point, thus causing a downward and rotational movement of the nose section to a cambered position. This flexure of the toggle linkage causes the toggle linkage to shorten the distance between its two ends to cause the variable camber section of the upper skin to assume a proper curved position.

To cause proper contouring of the variable camber lower skin section, an actuating member is connected to the lower skin and mounted for fore and aft slide motion to the frame. In the preferred form, this lower skin actuating member has a forwardly extending connecting arm which is connected to the variable camber lower skin section so as to permit the variable camber lower skin section to overlap the main lower skin portion during downward deflection of the nose section.

To cause proper coordinated movement of the pivot link, the toggle linkage, and the actuator for the lower skin section, each of these is provided with a related actuating link. The actuating link for the pivot link is connected to the forward swing end thereof and extends rearwardly therefrom. The actuating link for the toggle linkage connects to the flexure point thereof and extends downwardly therefrom. The actuating link from the slide actuator for the lower skin section connects thereto by its rear end and extends forwardly therefrom. The three actuating links connect one to another at a common actuating point and are moved simultaneously by an actuator which pushes their driven ends downwardly and rearwardly. In the preferred form, this actuator is a bell crank mounted to the frame and operated through a gear connection from a power shaft.

In the preferred form, the frame has a forwardly extending mounting arm having an upper surface which is positioned below the variable camber upper skin section and curved downwardly and forwardly, with the pivot link for the nose section being mounted to the forward end of this mounting arm. When the nose section is swung downwardly to its full cambered position, the variable camber upper skin section becomes positioned against the upper contour of the frame mounting arm so as to be supported in its proper curved configuration.

At the forward end of the lower variable camber skin section, the lower skin section is formed in two parts, which are interconnected by a spring member which permits limited forward and aft relative movement between the two lower skin sections while providing resistance to angular movement therebetween. This resistance to angular movement is substantially the same as the resistance to bending of the rest of the variable camber lower skin section so that the lower skin section has a substantially smooth contour in the area of the spring. However, in the event that the rearward movement of the lower skin actuating member is not properly matched with the downward and rearward movement of the nose section, this spring connection permits fore and aft adjustment of the lower skin section by permitting a small amount of overlap, without any substantial deviation of the lower skin section from its proper curved contour.

Other features of the present invention will become apparent from the following detailed description.

BRIEF DESCRIPTION OF THE DRAWINGS

FIG. 1 is a sectional view of a forward variable camber section of an airfoil made according to the present invention, taken transverse to the spanwise axis of the airfoil, and showing the airfoil in its uncambered position;

FIG. 2 is a view similar to FIG. 1, showing the forward section of the airfoil in its highly cambered position;

FIG. 3 is a view similar to views 1 and 2 showing the forward section of the airfoil in its moderately cambered position;

FIG. 4 is a view drawn to an enlarged scale of the compensating spring at the nose section of the airfoil;

FIG. 4A is a view similar to FIG. 4, showing the nose spring portion of the airfoil in the position of FIG. 3; and FIG. 5 is a sectional view taken along line 5—5 of FIG. 1.

DESCRIPTION OF THE PREFERRED EMBODIMENT

Since in this preferred embodiment described herein, the invention is incorporated in the leading edge portion of an airfoil, for convenience of illustration, only the forward portion of the airfoil is shown in the accompanying drawing.

The airfoil 10 comprises a main support frame 12 to which are attached upper and lower skins 14 and 16 respectively. At the forward end of the airfoil 10 there is a substantially rigid nose section 18 made up of a plurality of brackets 20 spaced along the length of the nose section 18 and having a peripheral flange portion 22 to which the forward ends of the upper and lower skins 14 and 16 are secured by rivets or some other suitable means, with the skins 14 and 16 joining one another in a smooth aerodynamic configuration at the nose section 18.

There is a variable camber upper skin section 14a which extends from the upper forward portion of the frame 12 to the nose section 18. There is also a variable camber lower skin section 16a which extends from the nose section 18 rearwardly to a location near the frame 12 where the lower variable camber skin section 16a overlaps at 24 the main lower skin portion 16.

Before describing specifically the components and operation of the present invention, it is believed that a better appreciation of the present invention will be achieved by indicating at this time, briefly, the main functions accomplished by the apparatus of the present invention. The present invention is designed to be able to maintain the airfoil 10 in a substantially uncambered position as shown in FIG. 1, and to be able to move the airfoil 10 to a full cambered position, as shown in FIG. 2, in such a manner that the upper skin 14 (particularly the variable camber section 14a) is at all times throughout the deployment in a smooth curve with no surface discontinuities which might induce flow separation. This requires that not only the downward and rotational movement of the nose section 18 be properly coordinated, but also that the distance of the nose section 18 from the frame 12 be properly controlled so that the variable camber upper skin section 14a can at all times assume a proper curvature which increases proportionately with increased deflection of the nose 18.

To proceed to a detailed description of the present invention, the leading edge portion of the airfoil 10 is provided with a plurality of linkage units 26 located at intervals along the length of the airfoil 10. For convenience of illustration, only one of the units 26 is shown herein.

The two main components of the linkage unit 26 which cooperate to position and cause proper movement of the nose section 18 are a toggle linkage 28 and a pivot arm 30. The toggle linkage 28 has a forward portion 32 connected by its forward end at 34 to an upper rear portion of its related nose bracket 20, and a rear portion 36 connected by its rear end 38 to an upper forward portion of the main support frame 12. The toggle linkage portions 32 and 36 are pivotally connected at an intermediate flexure point 40, positioned slightly to the rear of the mid-length of the toggle linkage 28.

The pivot arm 30 is connected by its forward swing end at 42 to a lower rear portion of the nose bracket 20 and is pivotally mounted by its rear end at 44 to the forward end of a mounting arm 46 formed integrally with the support frame 12. It will be noted that the fixed pivot connection 44 of the pivot arm 30 is located both upwardly and rearwardly of its connecting end 42. This mounting arm 46 extends into the variable camber area of the airfoil 10, and has an upper surface 48 which is contoured in a downward and forward curve. As will be disclosed more fully hereinafter, when the forward portion of the wing 10 is moved down to its full cambered position, this upper surface 48 provides support for the upper variable camber skin section 14a, as shown in FIG. 2.

Connected to and extending downwardly from the flexure point 40 of the toggle linkage 28 is a toggle actuating link 50. Also, there is a pivot arm actuating link 52 connected by its forward end to the forward swing end 42 of the pivot arm 30 and extending rearwardly therefrom. The two actuating links 52 and 50 join at a common actuating point 54.

To control movement of the lower variable camber skin section 16a, there is provided an actuating carriage 56 mounted by rollers 58 for fore and aft movement in a slideway 59 mounted to the frame 12. The carriage 56 has a forwardly extending arm 60 which connects at 62 to the upper surface of a rear portion of the lower variable camber skin section 16a. The carriage 56 is connected at 64 to the rear end of an actuating arm 66, the forward end of which is connected to the actuating links 50 and 52 at the common actuating point 54.

To supply power to the three actuating links 50, 52 and 66 there is provided a bell crank 68 rotatably mounted at 70 to the frame 12 and having a forwardly and downwardly extending actuating arm 72 which connects by its swing actuating end to the three links 50, 52 and 66 at the common point 54. To drive the bell crank 68 there is provided a helical gear 74 splined to a main drive shaft 76 which extends along the length of the airfoil 10 so as to be able to drive other linkage units 26 located at spaced intervals along the length of the airfoil 10. The gear 74 meshes with mating gear teeth 78 on the bell crank 68 in a manner that clockwise rotation of the shaft 76 causes a counterclockwise rotation of the bell crank 68 to move the actuating arm 72 downwardly and rearwardly from the position shown in FIG. 1 toward the position shown in FIG. 2.

To proceed now to a description of the operation of the present invention, let it be assumed that the airfoil 10 is in the position shown in FIG. 1, which is its "substantially uncambered" position. To move the airfoil 10 to its cambered position, the main drive shaft 76 is rotated clockwise (as seen in FIG. 1) to rotate the bell crank 68 counterclockwise and cause the actuating arm 72 to move the main actuating connecting point 54 downwardly and rearwardly toward the position shown in FIG. 2. This downward and rearward movement of the actuating connector 54 simultaneously causes three actions:

a. the link 52 swings the pivot arm 30 downwardly and rearwardly to cause the lower rear end connecting point 42 of the nose 18 to move along a downwardly and rearwardly extending arcuate path indicated at 80 in FIG. 1.

b. the toggle actuating link 50 moves the flexure point 40 of the toggle linkage 28 downwardly to cause the toggle members 32 and 36 to flex about the point 40 and thus cause a shortening of the distance between the two end toggle points 34 and 38, c. the link 66 moves the carriage 56 rearwardly to in turn hold the rear end of the lower variable camber skin section 16a firmly in place as it also is moved rearwardly.

The combined effect of these movements rotates the nose 18 counterclockwise as seen in FIGS. 1 and 2 as the nose 18 moves downwardly. Further, the contour of the upper skin 14 from the nose section 18 through the variable camber section 14a remains at all times a smooth continuous curve. The reasons for this are generally as follows. First, it should be noted that the distance between the two end toggle connecting points 34 and 38 is essentially the chord distance between the end points of the curve defined by the upper variable camber section 14a. Also, it should be noted that for moderate deflections, the amount which the end points 34 and 38 of the toggle linkage 28 move toward each other is essentially proportional to the square of the lateral deflection of the flexure point 40. Likewise, considering these same points 34 and 38 as being the ends of the arc defined by the variable camber upper skin section 14a, the amount which the chord length shortens is proportional to the square of degree of curvature of the skin section 14a. Thus the degree of curvature of the skin section 14a becomes a direct function of the lateral deflection of the toggle linkage 28.

The toggle linkage 28 is so arranged that its rate of flexure is matched to both the downward movement and the angular rotation of the nose section 18, which in turn is directly related to the desired degree of curvature of the upper variable camber skin section 14a. With the toggle actuating link 50 and the pivot arm actuating link 52 being driven from a common point 54, the rate of flexure of the toggle linkage 28 is necessarily coordinated with the pivot movement of the pivot arm 30, thus insuring that the rotational movement of the nose 18 and the contouring of the upper variable skin section 14a are properly coordinated throughout the movement of the airfoil from the position in FIG. 1 to the position in FIG. 2.

To proceed to an explanation of another facet of the present invention, with reference to FIG. 4, it will be noted that at the forward end of the lower variable camber skin section 16a there is attached to the upper surface of the skin section 16a an omega spring 82. This spring 82 has forward and rear flange sections 84 and 86 interconnected by a circular spring section 88. The two flange sections 84 and 86 are rigidly connected to the forward end of the skin section 16a, and between the two flanges 84 and 86, the skin section 16a is cut on a slant which extends upwardly and forwardly, as at 90.

To describe the significance of this omega spring 82, reference is made to FIG. 3, which shows the airfoil 10 in a position where the nose section 18 has rotated downwardly from its uncambered position in FIG. 1 only a moderate distance. It will be noted that in the initial downward travel of the nose section 18, there is not a substantial degree of flexure of the toggle linkage 28. The effect of this is that the rotational movement of the nose section 18 is at a rate that the skin section 16a at the location of the omega spring tends to move rearwardly at a slightly greater rate of travel than that at which the rear carriage 56 moves rearwardly. To avoid any distortion in the lower variable camber skin section 16a, the slit 90 is formed to permit the forward portion 91 of the skin section 16a to slide up over its immediate near portion 92 to a moderate extent, as shown in FIG. 4A. The resistance of the spring section 88 of the omega spring 82 is matched to the resistance of the skin section 16a to bending so that the two flanges 84 and 86 maintain the skin portions 91 and 92 in a proper line of curvature to match with the curvature of the rest of the lower variable camber section 16a.

It will be noted that the pivot arm 30 and its associated actuating link 52 each have a threaded adjustment sleeve to increase or decrease the length of either the arm 30 or the link 52. In the assembly of the various components in the airfoil 10, the length of these two components 30 and 52 can be adjusted, or "tuned" to obtain the proper rotational movement of the nose section 18.

It is to be understood that while the present invention has been described in its preferred embodiment of being incorporated into the leading edge of an airfoil of an aircraft, within the broader aspects of the present invention, it is to be recognized that the apparatus of the present invention could be incorporated in the rear section of an airfoil or in other devices which by virtue of their shape develop a lateral force when a compressible or incompressible fluid flows around the device.

What is claimed is:

1. A variable camber airfoil comprising:
   a. a support frame,
   b. upper and lower skins attached to said frame,
   c. a nose section,
   d. a variable camber upper skin section extending from a rear location at said frame to a forward location where said upper skin section is connected to said nose section,
   e. a variable camber lower skin section connected at a forward location to said nose section and extending rearwardly therefrom toward said frame,
   f. a pivot arm for said nose section, said pivot arm having a forward swing end connected to a lower portion of the nose section at a first forward connecting location, and a rear pivot end having a first rear pivot connection to said frame at a location upward and rearward of the first connecting location,
   g. a toggle linkage having a forward swing end member free of any direct pivot connection to said frame, said forward swing end member having a forward pivot end connected to an upper portion of said nose section at a second forward pivot connecting location which is above said first forward connecting location, a rear pivot end member having a second rear pivot connection to said frame at a location rearwardly of the second forward pivot connecting location, and an intermediate flexure portion about which said forward and rear members of the toggle linkage flex relative to each other, and said toggle linkage having a first position where said second forward pivot connecting location, said second rear pivot connection and said flexure portion are more nearly in a straight line configuration with said airfoil in a less curved configuration, and said second forward pivot connecting location at a more forward position, and a second position further from said straight line configuration with said airfoil in a more curved configuration, and said second forward pivot connecting location at a more rearward position,
   h. actuating means to swing said pivot arm downwardly and rearwardly and to flex said toggle linkage about said intermediate flexure portion to cause coordinated downward and rotational movement of said nose section to a cambered position, and to cause said toggle linkage to move further from said straight line configuration so as to shorten the distance between its two ends to cause the variable camber upper skin section to assume a curved cambered position and move said second forward pivot connecting location to said more rearward position.

2. The airfoil as recited in claim 1, wherein said frame has a forwardly extending mounting arm positioned between the upper and lower variable camber skin sections, said pivot arm being pivotally mounted at a forward end of said mounting arm, so that the axis of rotation of said nose section relative to the frame is positioned between the upper and lower variable camber skin sections, said mounting arm being spaced below said variable camber upper skin section, so that said upper variable camber skin section may flex and move downward to said mounting arm to provide the camber in said upper variable camber skin section.

3. A variable camber airfoil comprising:
   a. a support frame,
   b. upper and lower skin attached to said frame,
   c. a nose section,
   d. a variable camber upper skin section extending from a rear location at said frame to a forward location where said upper skin section is connected to said nose section,
   e. a variable camber lower skin section connected at a forward location to said nose section and extending rearwardly therefrom toward said frame,
   f. a pivot arm for said nose section, said pivot arm having a forward swing end connected to a lower portion of the nose section at a first forward connecting location, and a rear pivot end having a first rear pivot connection to said frame at a location upward and rearward of the first connecting location,
   g. a toggle linkage having a forward swing end member connected to an upper portion of said nose section at a second forward connecting location which is above said first forward connecting location, a rear pivot end member having a second rear pivot connection to said frame at a location rearwardly of the second forward connecting location, and an intermediate flexure portion about which said forward and rear members of the toggle linkage flex relative to each other, and
   h. actuating means to swing said pivot arm downwardly and rearwardly and to flex said toggle linkage about said intermediate flexure portion to cause coordinated downward and rotational movement of said nose section to a cambered position, and to cause said toggle linkage to shorten the distance between its two ends to cause the variable camber upper skin section to assume a curved cambered position,
   i. said actuating means comprising a toggle actuating link connected to said intermediate flexure portion and extending downwardly therefrom, whereby downward movement of said toggle actuating link causes downward flexure of said toggle linkage.

4. A variable camber airfoil comprising:
a. a support frame,
b. upper and lower skins attached to said frame,
c. a nose section,
d. a variable camber upper skin section extending from a rear location at said frame to a forward location where said upper skin section is connected to said nose section,
e. a variable camber lower skin section connected at a forward location to said section and extending rearwardly therefrom toward said frame,
f. a pivot arm for said nose section, said pivot arm having a forward swing end connected to a lower portion of the nose section at a first forward connecting location, and a rear pivot end having a first rear pivot connection to said frame at a location upward and rearward of the first connecting location,
g. a toggle linkage having a forward swing end member connected to an upper portion of said nose section at a second forward connecting location which is above said first forward connecting location, a rear pivot end member having a second rear pivot conneciton to said frame at a location rearwardly of the second forward connecting location, and an intermediate flexure portion about which said forward and rear members of the toggle linkage flex relative to each other, and
h. actuating means to swing said pivot arm downwardly and rearwardly and to flex said toggle linkage about said intermediate flexure portion to cause coordinated downward and rotational movement of said nose section to a cambered position, and to cause said toggle linkage to shorten the distance between its two ends to cause the variable camber upper skin section to assume a curved cambered position,
i. said actuating means comprising a nose actuating link having a forward end connected to a lower portion of said nose section and extending rearwardly therefrom, whereby rearward movement of said nose actuating link causes downward swing motion of said nose section.

5. A variable camber airfoil comprising:
a. a support frame,
b. upper and lower skins attached to said frame,
c. a nose section,
d. a variable camber upper skin section extending from a rear location at said frame to a forward location where said upper skin section is connected to said nose section,
e. a variable camber lower skin section connected at a forward location to said nose section and extending rearwardly therefrom toward said frame,
f. a pivot arm for said nose section, said pivot arm having a forward swing end connected to a lower portion of the nose section at a first forward connecting location, and a rear pivot end having a first rear pivot connection to said frame at a location upward and rearward of the first connecting location,
g. a toggle linkage having a forward swing end member connected to an upper portion of said nose section at a second forward connecting location which is above said first forward connecting location, a rear pivot end member having a second rear pivot connection to said frame at a location rearwardly of the second forward connecting location, and an intermediate flexure portion about which said forward and rear members of the toggle linkage flex relative to each other, and
h. actuating means to swing said pivot arm downwardly and rearwardly and to flex said toggle linkage about said intermediate flexure portion to cause coordinated downward and rotational movement of said nose section to a cambered position, and to cause said toggle linkage to shorten the distance between its two ends to cause the variable camber upper skin section to assume a curved cambered position, said actuating means comprising:
(1) a toggle actuating link connected to said intermediate flexure portion and extending downwardly therefrom, whereby actuation of said toggle actuating link causes downward flexure of said toggle linkage,
(2) said actuating means further comprises a nose actuating link having a forward end connected to a lower portion of said nose section and extending rearwardly therefrom, whereby actuating said nose actuating link causes downward swing motion of said nose section;
(3) said actuating means further comprises an actuating member to which said toggle actuating link and said nose section actuating link are both connected, said actuating member being mounted for movement in a rearward and downward direction to cause downward flexure of said toggle linkage and rotation of said nose section.

6. The airfoil as recited in claim 5, wherein said actuating member is operatively connected to a rotatably mounted drive member to cause said downward and rearward movement of the actuating member.

7. The airfoil as recited in claim 6, wherein there is a lower variable camber actuating member connected to a rear portion of said variable camber lower skin section, said lower variable camber actuating member being operatively connected to said actuating member.

8. The airfoil as recited in claim 5, wherein there is a lower variable camber actuating member connected to a rear portion of said variable camber lower skin section, said lower variable camber actuating member being operatively connected to said actuating member.

9. The airfoil as recited in claim 8, wherein said lower variable camber actuating member comprises a carriage mounted in a slideway for fore and aft motion thereon, said carriage having a forward extending connector to engage the rear portion of the lower variable camber skin section, said carriage having a connecting link by which said carriage is operatively connected to said actuating member.

10. A variable camber airfoil comprising:
a. a support frame
b. upper and lower skins attached to said frame,
c. a nose section,
d. a variable camber upper skin section extending from a rear location at said frame to a forward location where said upper skin section is connected to said nose section,
e. a variable camber lower skin section connected at a forward location to said nose section and extending rearwardly therefrom toward said frame,
f. a pivot arm for said nose section, said pivot arm having a forward swing end connected to a lower portion of the nose section at a first forward connecting location, and a rear pivot end having a first rear pivot connection to said frame at a location upward and rearward of the first connecting location, g. a toggle linkage having a forward swing end member connected to an upper portion of said nose section at a second forward connecting location which is above said first forward connecting location, a rear pivot end member having a second rear pivot connection to said frame at a location rearwardly of the second forward connecting location, and an intermediate flexure portion about which said forward and rear members of the toggle linkage flex relative to each other, and h. actuating means to swing said pivot arm downwardly and rearwardly and to flex said toggle linkage about said intermediate flexure portion to cause coordinated downward and rotational movement of said nose section to a cambered position, and to cause said toggle linkage to shorten the distance between its two ends to cause the variable camber upper skin section to assume a curved cambered position, i. a lower variable camber actuating member connected to a rear portion of the lower variable camber skin section, said actuating means having an operative connection to move said lower variable camber actuating member rearwardly simultaneously with the downward and rearward swing movement of the pivot arm and the flexing of the toggle linkage, whereby said lower variable camber skin section is moved rearwardly during the downward and rotational movement of the nose section to a cambered position.

11. The airfoil as recited in claim 10, wherein said lower variable area skin section is separated laterally into forward and rear skin portions, said airfoil further comprising spring means having a first end rigidly connected to said front portion and a second end rigidly connected to said rear portion, said spring means permitting relative forward and aft movement of said forward and rear skin portions, while resisting relative rotation therebetween with a force substantially matching that exerted by said variable area lower skin section in resisting bending moments exerted thereon.

12. The airfoil as recited in claim 11, wherein said spring means comprises a first flange connected to said front skin portion, a second flange connected to said rear portion, and a loop portion interconnecting said first and second flanges.

13. A variable camber airfoil comprising:
a. a support frame,
b. upper and lower skins attached to said frame,
c. a nose section,
d. a variable camber upper skin section extending from a rear location at said frame to a forward location where said upper skin section is connected to said nose section,
e. a variable camber lower skin section connected at a forward location to said nose section and extending rearwardly therefrom toward said frame,
f. a pivot arm for said nose section, said pivot arm having a forward swing end connected to a lower portion of the nose section at a first forward connecting location, and a rear pivot end having a first rear pivot connection to said frame at a location upward and rearward of the first connecting location, g. a toggle linkage having a forward swing end member connected to an upper portion of said nose section at a second forward connecting location which is above said first forward connecting location, a rear pivot end member having a second rear pivot connection to said frame at a location rearwardly of the second forward connecting location, and an intermediate flexure portion about which said forward and rear members of the toggle linkage flex relative to each other, and h. actuating means to swing said pivot arm downwardly and rearwardly and to flex said toggle linkage about said intermediate flexure portion to cause coordinated downward and rotational movement of said nose section to a cambered position, and to cause said toggle linkage to shorten the distance between its two ends to cause the variable camber upper skin section to assume a curved cambered position, i. a lower variable camber actuating member connected to a rear portion of the lower variable camber skin section, j. said actuating means comprising:
 (1) a toggle actuating link connected to said intermediate flexure portion and extending downwardly therefrom, whereby downward movement of said toggle actuating link causes downward flexure of said toggle linkage,
 (2) a nose actuating link having a forward end connected to a lower portion of said nose section and extending rearwardly therefrom, whereby rearward movement of said nose actuating link causes downward swing motion of said nose section,
 (3) a lower camber actuating link connected to the lower variable camber actuating member, and
 (4) an actuating member to which said toggle actuating link, said nose actuating link, and said lower variable camber link are connected, said actuating member being mounted for movement in a rearward and downward direction to cause flexure of said toggle linkage, rotation of said nose section, and rearward movement of said lower varible camber skin section.

14. The airfoil as recited in claim 13, wherein said actuating member comprises a bell crank pivotally mounted to said frame at a pivot location, said bell crank having a drive arm extending downwardly and forwardly from said pivot location to engage the toggle actuating link, the nose actuating link and the lower variable camber skin actuating link.

15. The airfoil as recited in claim 14, wherein there is rotational drive means having gear means thereon, said gear means engaging matching gear means on said bell crank to cause rotation of said bell crank to move said drive arm.

16. A variable camber airfoil comprising:
a. a support frame,
b. upper and lower skins attached to said frame,
c. a nose section,
d. a variable camber upper skin section extending from a rear location at said frame to a forward location where said upper skin section is connected to said nose section,
e. a variable camber lower skin section connected at a forward location to said nose section and extending rearwardly therefrom toward said frame, f. a pivot arm for said nose section, said pivot arm having a forward swing end connected to a lower portion of the nose section at a first forward connecting location, and a rear pivot end having a first rear pivot connection to said frame at a location upward and rearward of the first connecting location, g. a toggle linkage having a forward swing end member connected to an upper portion of said nose section at a second forward connecting location which is above said first forward connecting location, a rear pivot end member having a second rear pivot connection to said frame at a location rearwardly of the second forward connecting location, and an intermediate flexure portion about which said forward and rear members of the toggle linkage flex relative to each other, and h. actuating means to swing said pivot arm downwardly and rearwardly and to flex said toggle linkage about said intermediate flexure portion to cause coordinated downward and rotational movement of said nose section to a cambered position, and to cause said toggle linkage to shorten the distance between its two ends to cause the variable camber upper skin section to assume a curved cambered position, i. said frame having a forwardly extending mounting arm positioned between the upper and lower variable camber skin sections, said pivot arm being pivotally mounted at a forward end of said mounting arm, so that the axis of rotation of said nose section relative to the frame is positioned between the upper and lower variable camber skin sections, j. said mounting arm having a contoured upper surface which curves downwardly and forwardly to correspond in contour to a desired shape for the variable camber upper skin section in its full cambered position, so that with the upper skin section in its full cambered position, the upper contoured surface of said mounting arm engages said variable camber upper skin section to provide support therefor.

17. A variable camber airfoil comprising:
a. a support frame,
b. upper and lower skins attached to said frame,
c. a nose section,
d. a variable camber upper skin section extending from a rear location at said frame to a forward location where said upper skin section is connected to said nose section,
e. a variable camber lower skin section connected at a forward location to said nose section and extending rearwardly therefrom toward said frame,
f. a pivot arm for said nose section, said pivot arm having a forward swing end connected to a lower portion of the nose section at a first forward connecting location, and a rear pivot end having a first rear pivot connection to said frame at a location upward and rearward of the first connecting location, g. a toggle linkage having a forward swing end member connected to an upper portion of said nose section at a second forward connecting location which is above said first forward connecting location, a rear pivot end member having a second rear pivot connection to said frame at a location rearwardly of the second forward connecting location, and an intermediate flexure portion about which said forward and rear members of the toggle linkage flex relative to each other, and h. actuating means to swing said pivot arm downwardly and rearwardly and to flex said toggle linkage about said intermediate flexure portion to cause coordinated downward and rotational movement of said nose section to a cambered position, and to cause said toggle linkage to shorten the distance between its two ends to cause the variable camber upper skin section to assume a curved cambered position, i. a lower variable camber actuating member connected to a rear portion of the lower variable camber skin section, j. said actuating means further comprising:
(1) a toggle actuating link connected to said intermediate flexure portion and extending downwardly therefrom, whereby downward movement of said toggle actuating link causes downward flexure of said toggle linkage,
(2) a nose actuating link having a forward end connected to a lower portion of said nose section and extending rearwardly therefrom, whereby rearward movement of said nose actuating link causes downward swing motion of said nose section,
(3) a lower camber actuating link connected to the lower variable camber actuating member, and
(4) an actuating member to which said toggle actuating link, said nose actuating link, and said lower variable camber link are connected, said actuating member being mounted for movement in a rearward and downward direction to cause flexure of said toggle linkage, rotation of said nose section, and rearward movement of said lower variable camber skin section, and k. said lower variable area skin section being separated laterally into forward and rear skin portions, said airfoil further comprising spring means having a first end rigidly connected to said front portion and a second end rigidly connected to said rear portion, said spring means permitting a relative forward and aft movement of said forward and rear skin portions, while resisting relative rotation therebetween with a force substantially matching that exerted by said variable area lower skin section in resisting bending moments exerted thereon.

* * * * *